United States Patent [19]
Paulett et al.

[11] Patent Number: 5,766,773
[45] Date of Patent: Jun. 16, 1998

[54] LAMINATED STRETCH WRAP FILM ADHERED BY CLING FORCES

[75] Inventors: Harry K. Paulett, Lakewood, Ohio; George E. Paris, Gillette, Wis.

[73] Assignee: Ventilair Films, Inc., Lakewood, Ohio

[21] Appl. No.: 526,165

[22] Filed: Sep. 11, 1995

Related U.S. Application Data

[63] Continuation-in-part of Ser. No. 969,121, Oct. 30, 1992.
[51] Int. Cl.⁶ .................................................. B32B 27/32
[52] U.S. Cl. .......................... 428/523; 428/131; 428/137; 428/516; 428/338; 428/220; 428/411.1
[58] Field of Search ............................ 428/131, 137, 428/516, 523, 338, 220, 411.1

[56] References Cited

U.S. PATENT DOCUMENTS

| | | | |
|---|---|---|---|
| 1,359,477 | 11/1920 | Miller | 53/528 |
| 2,842,910 | 7/1958 | Reed | 53/463 |
| 3,012,918 | 12/1961 | Scharr | 428/137 |
| 3,454,455 | 7/1969 | Rasmussen | 428/136 |
| 3,589,102 | 6/1971 | Zelnick | 53/184 |
| 3,649,431 | 3/1972 | Parker | 428/137 |
| 3,719,736 | 3/1973 | Woodruff | 264/156 |
| 3,758,355 | 9/1973 | Witherow | 156/157 |
| 3,911,186 | 10/1975 | Trotman | 428/137 |
| 4,050,211 | 9/1977 | Lancaster, III et al. | 52/726 |
| 4,077,179 | 3/1978 | Lancaster et al. | 53/32 |
| 4,152,879 | 5/1979 | Shulman | 53/399 |
| 4,261,944 | 4/1981 | Hufnagel et al. | 264/175 |
| 4,409,776 | 10/1983 | Usui | 53/399 |
| 4,418,114 | 11/1983 | Briggs et al. | 428/218 |
| 4,876,146 | 10/1989 | Isaka et al. | 428/347 |
| 4,927,708 | 5/1990 | Herran et al. | 428/332 |
| 4,935,271 | 6/1990 | Schirmer | 428/35.2 |
| 5,013,595 | 5/1991 | Parry | 428/27 |

*Primary Examiner*—William Watkins
*Attorney, Agent, or Firm*—Fay, Sharpe, Beall, Fagan, Minnich & McKee

[57] ABSTRACT

A stretch film comprises a first extruded sheet of polyethylene stretch film having a plurality of coextruded layers and a second sheet of polyethylene stretch film having a plurality of coextruded layers. The second sheet of polyethylene stretch film is clingingly form pressed to the first extruded sheet to completely laminate the first sheet. The laminated film is a machine wrappable stretch film that is elastically stretchable beyond 320% and not heat shrinkable.

6 Claims, 4 Drawing Sheets

U.S. Patent    Jun. 16, 1998    Sheet 1 of 4    5,766,773
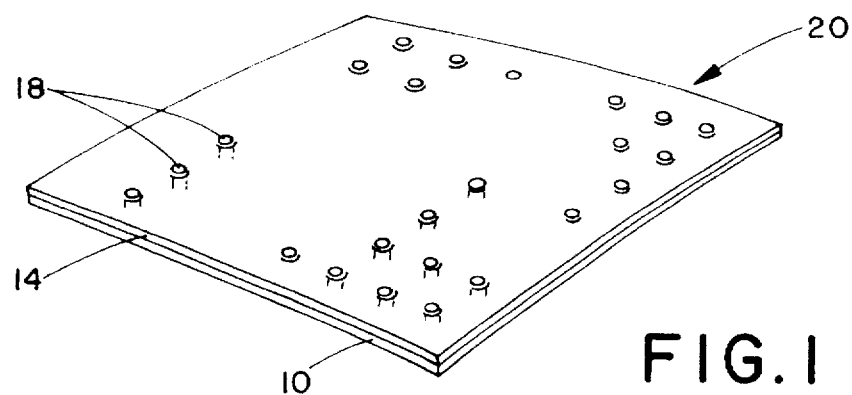
FIG. 1
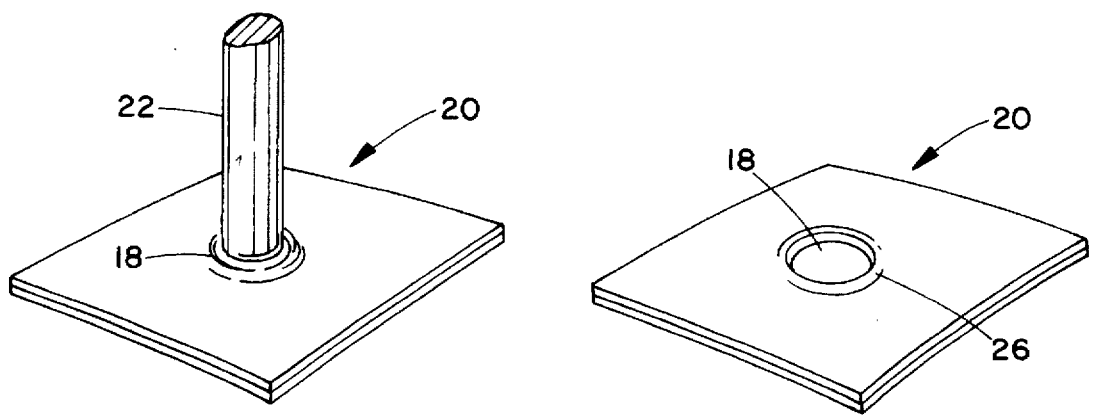
FIG. 2          FIG. 3
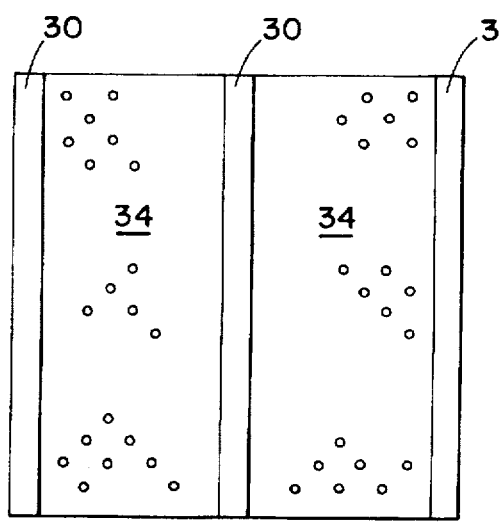     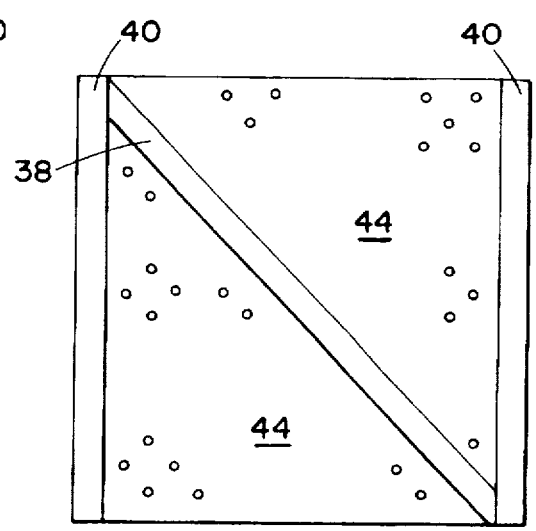
FIG. 4          FIG. 5

LAMINATED STRETCH WRAP FILM ADHERED BY CLING FORCES

This is a continuation-in-part of U.S. application Ser. No. 07/969,121 filed on Oct. 30, 1992 pending.

BACKGROUND OF THE INVENTION

The present invention is directed to the art of packaging materials, and more particularly to the art of plastic bundling and palletizing materials. The present invention is especially concerned with the art of plastic stretch wrap film, and will be described with particular reference thereto.

Stretch wrap films of the prior art are used in connection with a variety of overwrap packaging applications. They are typically applied to pallet loads, boxes, sheeted materials and other items in an effort to secure them for shipping or transport. The existing stretch wrap films provide desirable results when used in connection with products that are not required to breathe. They are wrapped about a pallet load so completely that air flow to and from the wrapped or packaged items tends to be restricted. Moreover, the quantity of film used in wrapping a pallet load is so great that an extreme amount of waste is produced.

Existing stretch wraps often cause irreparable damage, such as warping or the formation of rot, mold or mildew, to merchandise that requires the ability to breathe. For example, existing stretch wraps are undesirable in situations where the products to which they are applied are packaged at elevated temperatures. Food items are often packed for shipping while they are still hot. It is necessary for the heat to dissipate, and the existing wraps do not provide for this. Similarly, many types of bottles (e.g. wine bottles) are labeled and packaged while the label is still hot. By retaining the heat, the label is often damaged. Beverages, too, often form condensation on the surfaces of their cans and bottles. The condensation must be allowed to escape and existing stretch film wraps do not permit this.

Preexisting film wraps tend to suffocate items such as fresh produce, food, products packed hot, fabric and tobacco. The existing stretch wraps do not permit gases, vapors, or heat to escape from a wrapped pallet load. Moreover, existing stretch wraps often permit molding and hence, damage to fabrics, furniture and crops.

Attempts have been made to overcome the problems described above. For example, existing wrapping machinery has been modified to include a perforator on the stretcher mechanism. Perforations made by this mechanism in standard stretch film cause tearing in the stretch wrap and the wrapping is not secure.

Other attempts have been made as well. For example, netting has been used as an alternative to stretch wrap because of its ability to breathe. Netting is most commonly seen in connection with fruits, such as apples and oranges. Netting is, however, undesirable because it is expensive and has poor load retention. Also, there is a danger that workers or machinery may become caught in the netting, causing serious injury or damage.

Environmental and economic concerns define a need for industrial packagers to reduce the amount of solid waste for protecting the environment and saving limited landfill space. The Environmental Protection Agency lists source reduction as a first step in its solid waste management hierarchy. Conventional pallet wrap film such as 80×20 film typically stretches to about 120%, beyond which the film necks down and breaks. Thus, a large quantity of film must be used to wrap a pallet load, contributing to both the solid waste problem as well as the expense of wrapping. There is a need to reduce film size and improve the stretch of pallet wrap film without sacrificing strength in order to economically address the source reduction step defined by the EPA.

It is desirable to develop a stretch film which provides breathability as well as strength. It is further desirable to develop a method for making such a breathable, strong stretch film. It is still further desirable to develop a strong stretch wrap film which contributes significantly and economically to source reduction, while at the same time allowing pallet loads to breathe.

The present invention contemplates a new and improved air permeable stretch wrap which overcomes all of the above problems and others and provides a bundling or palletizing material which is strong, flexible and fluid permeable. An alternative embodiment of the present invention provides a stretch wrap film which has improved strength and stretchability and contributes economically to source reduction.

BRIEF DESCRIPTION OF THE INVENTION

In accordance with the present invention, there is provided a fluid permeable stretch film as well as a method for producing such stretch film.

In accordance with a more limited aspect of the invention, a fluid permeable stretch film comprises a first layer of polymeric film capable of providing at least 150% stretch or increase over its original length. A second layer of polymeric film also capable of providing to at least 150% stretch over its original length is laminated with said first layer to form a laminated product. A plurality of self-reinforcing perforations are defined by said laminated product.

The invention further calls for a method of preparing a fluid permeable stretch film. The method calls for providing a first layer of polymeric film capable of providing at least 150% stretch over and above its original length, and then laminating it with a second layer of polymeric material capable of providing at least 150% stretch above its original length to form a laminated product. The laminated product is then perforated by using a hot pin which is brought close enough to "kiss" or melt the material without necessarily breaking through, and a weld is formed between the layers of the laminated product as the melted portion hardens. The resulting product comprises a fluid permeable stretch film.

An alternative embodiment of the invention calls for a narrow band of stretch film which can range from about 2 to 60 inches, preferably in the range of 2 to 10 inches. The film stretches to greater than 300% its original length and is strong enough to use in securing pallet loads. The narrow width of the film allows for significant spacing between wraps, thereby permitting pallet loads to breathe.

A principal advantage of the invention is the ability for the film to exhaust or transmit hot air, gases, odors and moisture away from the item which is packaged and into the ambient atmosphere.

Another advantage of the present invention is that it prevents rust from forming on products that are wrapped with it and allows for the gases, vapors and heat to escape from a pallet load.

Another advantage of the present invention is found in the prevention of mold formation on fabrics and furniture which are wrapped by the stretch wrap of the present invention.

Still another advantage of the present invention is the preservation of food and other products subject to decay, damage or destruction by trapped air or gases.

Yet other advantages of the stretch film of the present invention are found in its natural resource and environmental aspects. The resins used in producing the product are made from natural gas, so there is a plentiful supply. Moreover, the stretch film product may be recycled.

Other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof.

FIG. 1 illustrates a section of stretch wrap film in accordance with the present invention.

FIG. 2 represents a hot pin as it forms a perforation in the stretch wrap film.

FIG. 3 shows a diagrammatical representation of a weld formed around a perforation.

FIGS. 4 and 5 provide examples of stretch wrap film having non-perforated sections.

DETAILED DESCRIPTION OF THE PREFERRED EMBODIMENT

Figure 6:
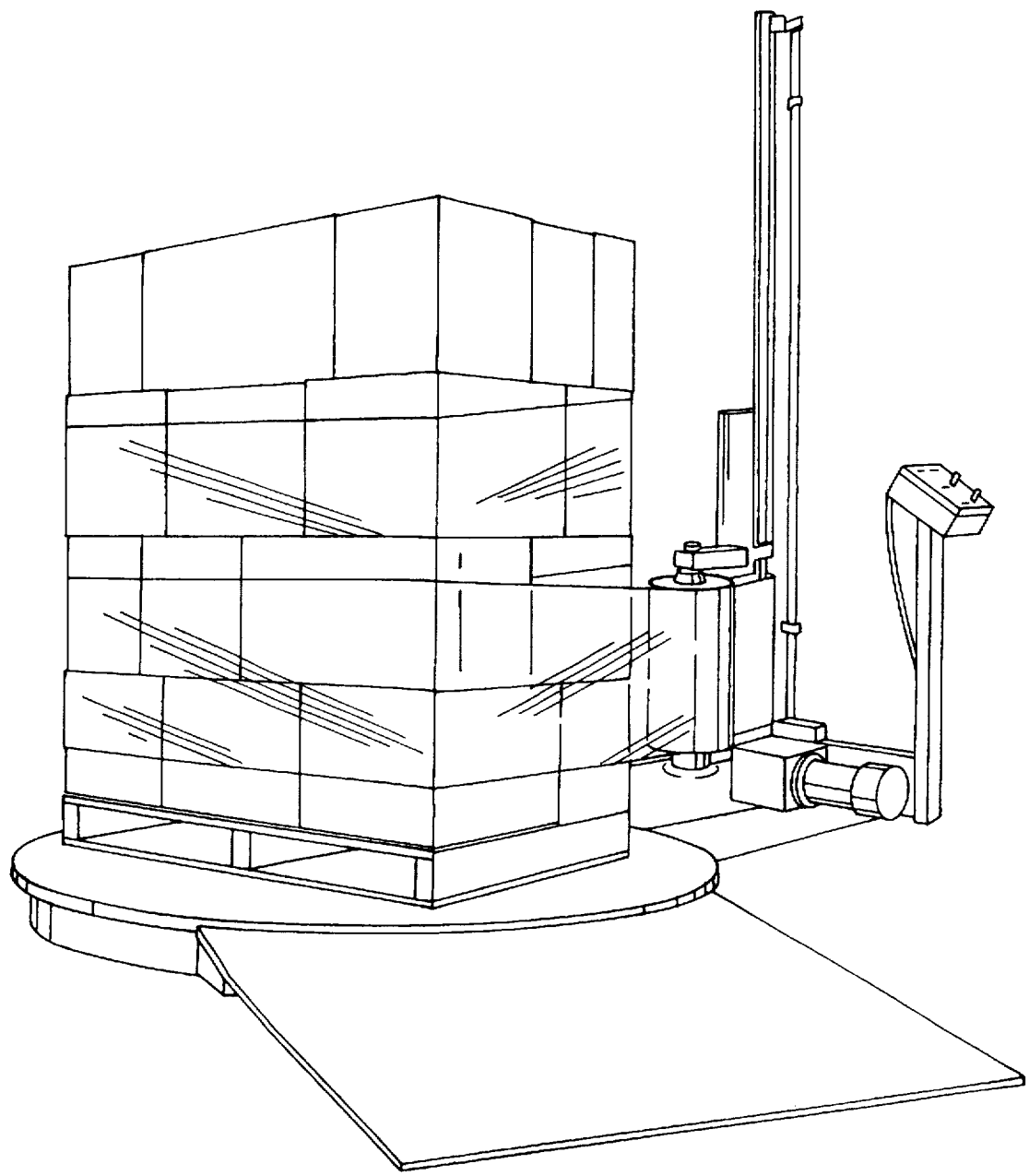
FIG. 6 shows a method of applying stretch wrap film to a bundle.

Referring now to the drawings wherein the showings are for purposes of illustrating the preferred embodiment of the invention only and not for purposes of limiting same, the figures show an air permeable stretch film in accordance with the present invention.

With attention first to FIG. 1, a first layer or ply 10 of polymeric film is laminarly bonded by natural cling forces with a second layer or ply of polymer film 14 to form a resulting laminated product. A plurality of perforations 18 are made through the film layers. The perforations are formed by a hot pin. The hot pin merely "kisses" the laminate without a need for passing through in order to form a perforation. When the hot pin approaches the laminated product formed by layers 10 and 14, the polymeric material melts.

With attention directed to FIG. 2, a diagrammatical representation of a hot pin forming a perforation in a small section of laminated product 20 is shown. The hot pin 22 does not perforate the laminate. Rather, it merely approaches or lightly contacts the laminate in the manner of a kiss. The heat dissipating from pin 22 causes the laminate to melt, thereby forming a perforation substantially corresponding to the cross sectional shape of the pin. The hot pin 22 shown in FIG. 2 is circular in configuration. Therefore, the resulting perforation 18 defined by the laminate is substantially circular. It is to be appreciated that the perforation and hot pin are not limited to having a circular configuration. Squares, diamonds, triangles and other shapes, including amorphous shapes, will serve the purpose as well.

As the polymer dries, a weld forms about the perimeter of each perforation. The weld serves to assist in maintaining layers 10 and 14 in their cohesive bond or cling arrangement. The weld also strengthens the product by preventing the resulting laminar film from breaking or tearing during stretching. As shown in FIG. 3, a section of laminated sheet product 20 is shown, with an enlarged view of a single perforation 18. The resulting perforation is actually defined by weld 26, said weld having been formed during the hardening of the melted laminate.

The polymeric material used for layers 10 and 14 comprises an olefin. Preferably, the polymeric material is a linear low density polyethylene (LLDPE). Of course, other materials can be used in forming the laminated product. A distinctive feature of the present invention resides in the ability for the two polymeric film materials 10 and 14 to naturally cling or bond to one another. The welds associated with the perforations serve to strengthen the resulting stretch film.

The resulting laminate comprising layers 10 and 14 with weld holes 18 comprises a breathable stretch film. Any number of perforations may be formed, although in the preferred embodiment, the film comprises approximately 27 holes per square inch, with the size of the hole being roughly around one to one and one half mm in diameter. The holes may vary in size. The film, when wrapped around the product, allows for the transmission or exhaustion of hot air, gases, odors, water, moist air and other fluids from the wrapped item or items.

Tests were conducted on a sample of 100 gA laminate perforated with 27 holes per square inch. The air transmission rate was calculated as being about 0.625 cc/100 $in^2$/24 hrs. The oxygen transmission rate was calculated as being about 3.00 cc/100 $in^2$/24 hrs. The water vapor transmission rate was calculated as being about 22.88 gms/100 $in^2$/24 hrs.

The resulting film laminate can be stretched to as much as 200 to 300% over its original length. In a preferred embodiment, 100 gauge laminate should be able to stretch to at least about 120% over its original length. In other words, a 10 inch length of the resulting 100 gauge laminate can be stretched to at least 22 inches or as much as 30 or 40 inches.

The 160 gauge stretch wrap stretches to at least 80% beyond its original length. In other words, a 10 inch length of 160 gauge stretch wrap will stretch to at least 18 inches.

The weld-reinforced perforations present in the stretch wrap strengthen the stretch wrap and do not permit stretching to as great of an extent as when only a single ply of unlaminated film is used. This is an advantage over preexisting stretch films which comprise only a single layer of film.

When stretched to given lengths, the stretch wrap film of the present invention exhibits elastic characteristics and is able to revert downward in size after being stretched. The stretch film resists neck down during stretching to predetermined lengths.

In preparing the laminate, two individual rolls of LLDPE polymeric film (or other film) are provided. The film is unwound from each of the rolls at room temperature and the two sheets or plies are made to adhere to one another through natural cling or cohesive bonding. The result is a laminated product comprising two layers or plies of LLDPE. The resulting laminate is then passed through a perforator which comprises a series of hot pins that melt the film around them to liquid state. The pins do not need to pierce the laminate in forming perforations. As the melted sections of the polymeric product resolidify, reinforcements or welds are formed around each perforation. The resulting laminated product or stretch wrap film is subsequently rewound about another core.

An interesting feature of the present invention is that when the film is stretched, circular shaped perforations defined by the hot pins maintain their overall shape. In other words, as the film is stretched, the individual circular perforations develop larger circular configurations. It is not likely that the perforations become elongated in the direction of the stretch. The 1½ mm perforations may elastically stretch to three times their initial size.

The linear low density polyethylene resin film used in the preferred embodiment is a co-extrusion of a number of components. For example, each film 10 and 14 may be co-extruded with ethyl vinyl acetate (EVA), polyisobutene (PIB) and other additives. The resulting separate film layers or plies are comprised of three sublayers. Two outer or skin sublayers each make up about 10% of the film. The center or core layer makes up about 80% of the film. The PIBs and EVAs are typically within the core sublayer. The three sublayers are extruded by a cast or blown method to form a film that has the ability to stretch up to 300% over the original length. The resulting co-extruded multi-component films are laminated into two layers 10 and 14. The lamination provides for increased strength and the avoidance of tearing.

Tearing is further reduced by refraining from perforating certain strips or sections of film. FIGS. 4 and 5 show examples of ways in which the non-perforated strips can be employed. In FIG. 4, roughly three 1" strips 30 appear in a 20 square inch sheet of laminate. The three 1" strips are not perforated while the remaining areas are perforated. These strips serve to add extra strength or reinforcement to the resulting stretch wrap product.

FIG. 5 shows a 20 square inch sheet of laminated stretch wrap with a non-perforated strip 38 transversing across a bias thereof. Other optional portions of non-perforated area 40 are shown. Here again, the non-perforated strips are shown for purposes of adding strength. Areas 44 are perforated.

The resulting perforated stretch film is intended for use in connection with wrapping packages that require breathing. The stretch wrap typically calls for load bundling or palletizing. The loads or packages will be wrapped using stretch wrap machinery such as that provided by Lantech, Stretch Tec and others. The stretch wrap is strong and tough and offers excellent load retention. While applying the stretch wrap to loads or packaging, it should be overlapped around 1.5" from layer to layer. Only one wrap from top to bottom is required, but the product will still offer ventilation with two layers. The film will stretch to as much as 200 to 300% beyond its original length, although roughly a 120 stretch is all that is needed with this product.

FIG. 6 shows an example of wrapping a bundle of boxes using the stretch wrap of the present invention. The film is initially placed against the load and then slightly stretched or pulled in a longitudinal direction as it wraps. The elastic nature of the stretch wrap causes it to recede slightly from its stretched state to form a tight fit around the load. The stretch wrap is applied so that it overlaps itself by around 1.5" during consecutive passes. This self cling ability allows for completing the bundling or packaging operation without application of fasteners or adhesives. The wrapping operation may take place in any number of conventional ways. For example, as shown in the figure, the load may be spun on a rotating platform with the stretch wrap positioned on a roll in vertical relation to the platform, thus providing a horizontal wrap. The roll is moved in upward and downward directions to complete the wrap. It is also possible for the platform to raise and lower. Although not shown, the wrapping may occur in other manners such as, for example, wrapping a load in vertical or multi-layer fashions.

Figure 7:
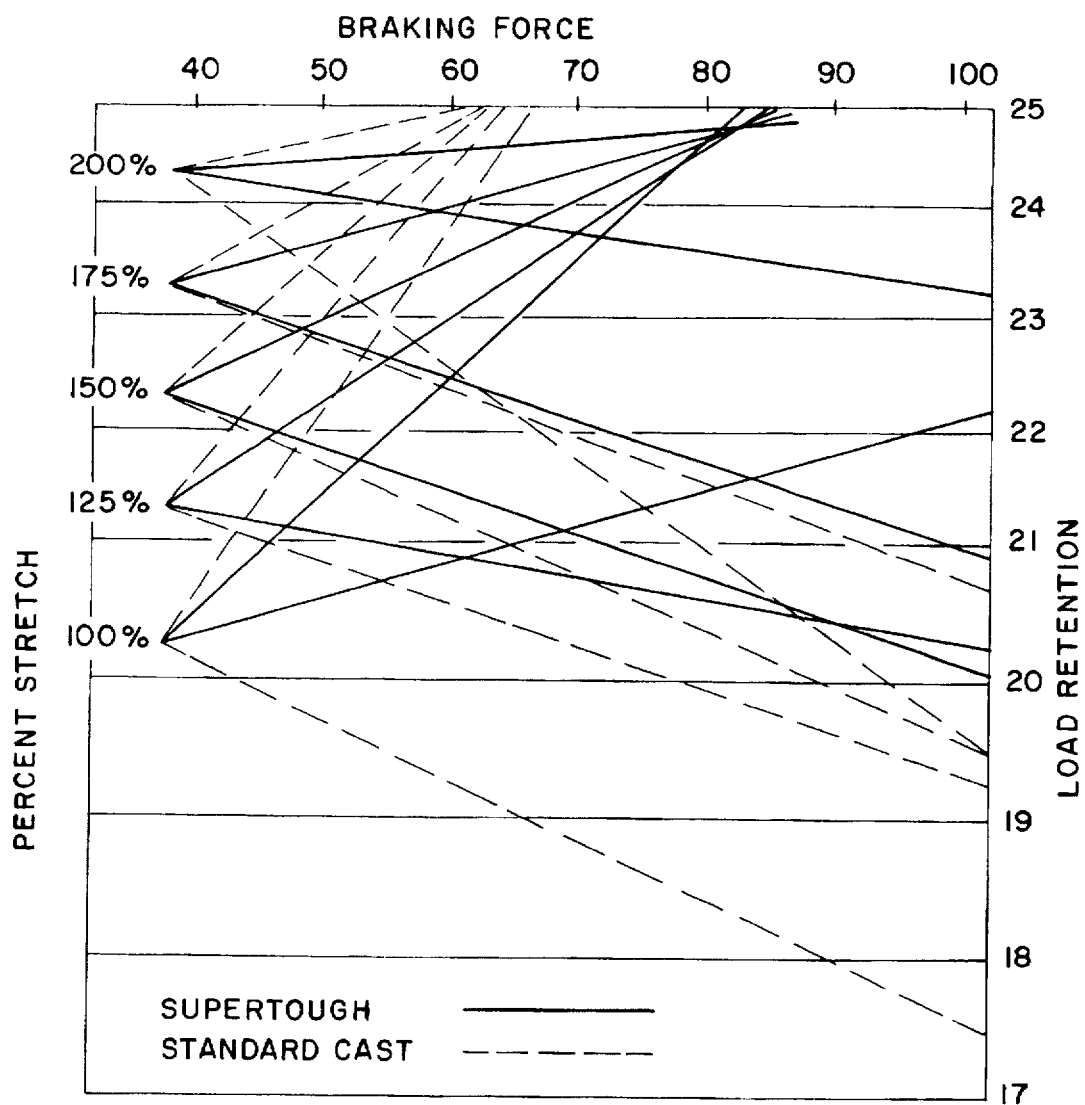
FIG. 7 graphically represents the results of comparative breaking and load retention tests.

Comparative breaking and load retention tests were conducted using 20" rolls of the laminated sheet wrap product of the present invention and 20" rolls of a standard cast 90 film. Results are shown in FIG. 7. As will be noted, for each given percent of stretch, the laminated product of the present invention showed improved results in both breaking and load retention.

Figure 8:
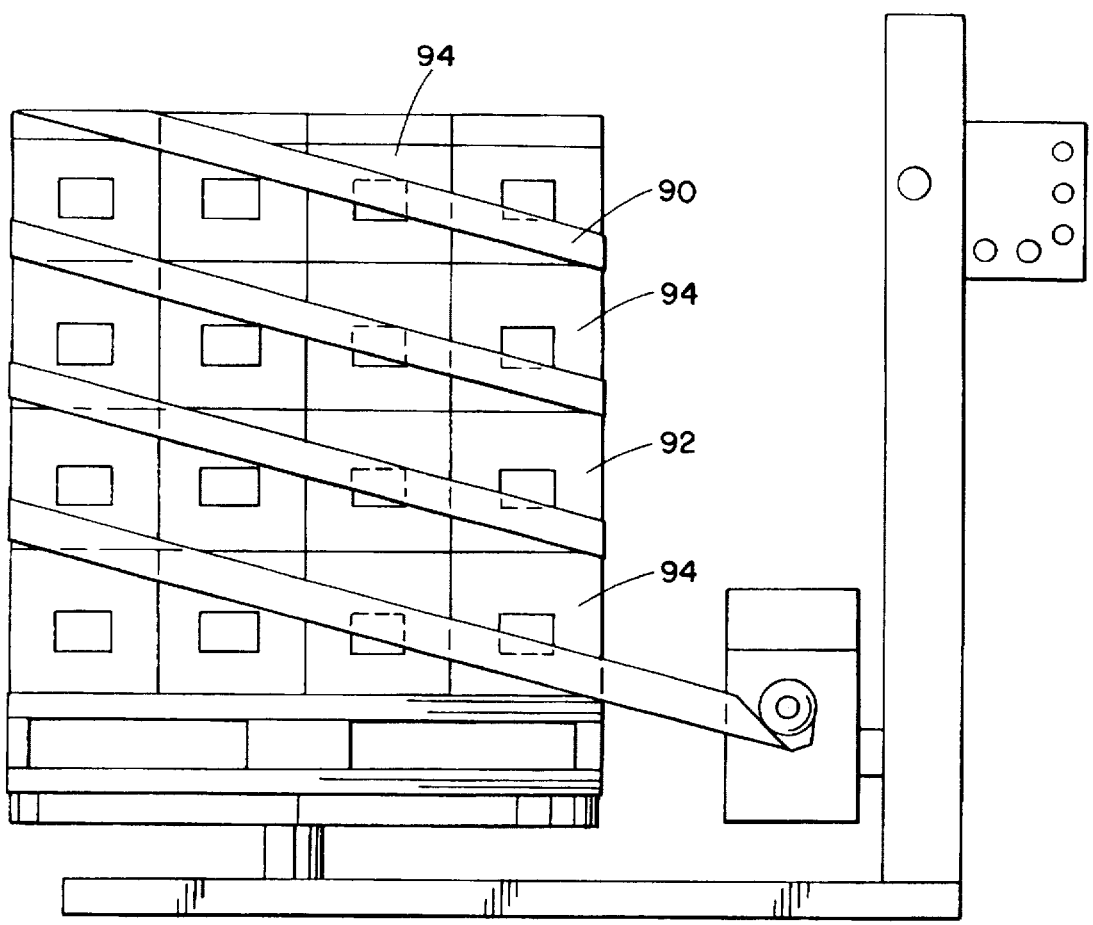
FIG. 8 shows a method of applying a narrow band of film to a pallet in accordance with the present invention.

The advantage of breathability can also be accomplished by preparing a narrow strip, (i.e. 5" in some instances) of unperforated laminated sheet wrap product and applying it to a pallet or bundle without self-overlap. In other words, by wrapping a relatively narrow ribbon of sheet wrap product around a load such that gaps are left between passes, the wrap forms a strong yet fluid-permeable palletizing or bundling material. FIG. 8 shows a method of applying a narrow band of film to a pallet in accordance with an alternative embodiment of present invention. Narrow film 90 is wrapped about a pallet load of boxes 94. As will be noted, the film is relatively narrow such that it does in fact leave a substantial amount of exposure such as at 92. The plastic film itself may be usable in a range of 2 to 60 inches, although for the present application it is desirable that the narrow film be in the range of anywhere from 2 to 10 inches in width, with a range of 5 to 7.5 inches being preferred. The film is comprised of resins including linear low density polyethylene (LLDPE), butenes and hexenes. The film itself is comprised of two polyethylene sheets which are form-pressed together without the need for adhesives. In other words, the individual sheets have sufficient natural cling properties to stick to themselves. There is no need to add PIB or a tackifier as described by the prior art, since there is natural cling in the sheet.

The form-pressed film represented by FIG. 8 may be stretched to far greater lengths than the films of the prior art. The narrow 2 to 10 inch stretch films can stretch to well beyond 320% while conventional films typically fail at 200% stretch or less. The significant stretchability of the present film is attributable to the form pressing together of two or more individual films.

The narrow film of FIG. 8 is comprised of two or more sheets of three-sublayer coextruded films such as a cast or blown film. Individual sublayered sheets are bonded together to produce a strong laminated or formpressed stretch film.

Each of the individual three-sublayer sheets used in preparing the resulting stretch wrap film is comprised of an A-B-A arrangement. Roughly eighty percent of the individual sheets is comprised of the core or "B" layer. This B layer is sandwiched between two outer or "skin layers" A which comprise roughly the remaining 20% of the sheet. About 10% of the sheet is comprised of an upper skin "A" and roughly 10% is formed by a lower skin "A". All three sublayers may be comprised of the same material (e.g. polyethylene) or different materials. By changing the materials, different film properties are realized.

The sheet material is prepared by extrusion methods known in the art. The raw materials used in preparing the films of this embodiment preferably comprise odorless, opaque white polyethylene pellets or granules. The polyethylene pellets or granules are heated to around 500 or 525 to form a melt. The film is extruded.

The typical physical and chemical properties of the raw materials are as follows:

| SPECIFIC GRAVITY | 0.92–0.970 |
|---|---|
| SOLUBILITY IN WATER, WT. % AT °F. | Insoluble |
| FREEZING/MELTING POINT °F. | 225 to 229° F. |
| CONDITIONS TO AVOID INSTABILITY | Temperatures over 650° F. (343 C.) may cause resin degradation |

Films of the alternative embodiment may be 100 to 400 gauge, preferably 160 gauge. In preparing a 160 gauge stretch wrap, two 80 gauge film sheets are form pressed together. The film may be produced in a variety of colors, and a reinforcing strip may be placed between the layers.

When a 120 gauge film and an 80 gauge film are made by the same manufacturer on the same machinery using the same chemical composition, the 120 gauge film will be about 50% thicker than the 80 gauge film. Different manufacturers and different processes (i.e. blown versus cast) lead to some differences. Cast films are stronger in the machine direction, and blown films are stronger in the transverse direction. The transverse direction is across the web as opposed to being in the unwind or machine direction. An 80 gauge 7½ wide film will not likely stretch beyond 100%. As the gauge increases, there is an increase in holding force. A regular 120 gauge film may stretch to 120%, and a form pressed 120 gauge film of the present invention stretches to 300% or greater.

The formpressed film of the present invention provides for significant savings in cost and in source reduction. In one example, the formpressed film of the present invention was compared with conventional 20×80 film. The following table sets forth the overall comparison:

| TABLE OF UNSTRETCHED FEET, STRETCHED FEET AND NUMBER OF OUNCES | | | |
|---|---|---|---|
| | LENGTH NO STRETCH (FEET) | OUNCES | LENGTH STRETCHED (FEET) |
| Formpressed | 55.35 | 2.13 | 231 |
| 20 × 80 | 55.35 | 5.67 | 166 |

| PRICE PER PALLET COMPARISON | | | |
|---|---|---|---|
| Formpressed costs .106 oz. | | 20 × 80 ga. costs .066 per oz. | |
| OUNCES | COST | OUNCES | COST |
| 2.13 | 0.226 | 5.67 | 0.374 |

Also, the above table reflects a source reduction of 3.54 ounces per pallet, as well as a cost savings. The formpressed film costs 0.106 per oz. The 20×80 gauge costs 0.066 per oz. However, much less form pressed film is used in comparison to the prior art 20×80 film. The formpressed film offers a savings of 0.148 per pallet. The narrow formpressed films described herein may be applied to pallets using conventional machinery.

In testing the formpressed narrow films of the present invention (such as that shown in FIG. 8) against standard 20×80 films, hydroforce was used to compare the films. A hydroforce measurement is accomplished by attaching a hydraulic mechanism to the prestretch portion of the pallet wrapper. Film travels through two rollers and some idler rolls to the pallet. In operation, the first roll through which the film passes revolves at a slower speed than the second roll which is controlled by an electric motor with variable speed. By increasing the speed of the second roll and increasing the force of the hydraulic brake of the first roll, the film will stretch. The force to cause the film to stretch is hydroforce. In other words, hydroforce is the hydraulic force applied to the first roll to slow the first roll. Unwind force is the force applied to the film to cause the film to stretch. Prestretch force is the force the film applies to the pallet. Prestretch force determines the film's ability to secure the load.

The following chart sets forth a comparative analysis of the stretch film of the present invention:

| SAMPLE IDENTIFICATION MATERIAL | 18584-045 001 LINE II ABA-CO-EX | 18584-045 002 270%-1650 120 GA | 18584-045 003 340%-1800 160 GA |
|---|---|---|---|
| Tensile | | | |
| Tensile @ Yield (psi) | | | |
| MD | 1189 | 1182 | 1190 |
| TD | 1044 | 1086 | 1163 |
| At 200% MD | 1647 | 2604 | 1724 |
| Ultimate Tensile (psi) | | | |
| MD | 6199 | 9338 | 7226 |
| TD | 4045 | 4235 | 4200 |
| Elongation @ Yield (%) | | | |
| MD | 6.2 | 6.4 | 6.2 |
| TD | 6.0 | 5.9 | 5.9 |
| Break Elongation (%) | | | |
| MD | 470 | 413 | 480 |
| TD | 710 | 745 | 719 |
| 1% Secant (psi) | | | |
| MD | 23,500 | 19,100 | 22,020 |
| Elm. Tear (g/mil) | | | |
| MD | 194 | 141 | 146 |
| TD | 735 | 881 | 814 |
| Gauge Mic (mils) | | | |
| Average | 0.86 | 1.25 | 1.58 |
| Low | 0.81 | 1.17 | 1.50 |
| High | 0.92 | 1.29 | 1.71 |
| Haze % | 1.0 | 1.0 | 1.1 |
| Gloss | 93 | 90 | 89 |
| Cling | | | |
| Parallel Force (gms) | | | |
| 0% | 194.88 | 135.63 | 158.48 |
| 100% | 104.13 | 127.21 | 126.52 |
| 200% | 61.56 | 84.38 | 85.90 |
| Shrink (%) | | | |
| MD | 53 | 73 | 66 |
| TD | −12 | −26 | −22 |

The resulting films were tested and compared to standard 20×80 gauge film used in the art. First, a 5" wide sample of the stretch wrap film of the present invention was compared with the standard 20×80 gauge film of the prior art. Specifically, equal lengths of both types of films were compared. As will be noted from the following table, when the standard 20×80 gauge film was stretched to 200%, a significantly greater weight of film was used as compared to the 5" and 7.5" wide films of the present invention which were stretched to 290% and 320%. Thus, less film is used, on a weight basis, with far greater stretch. These factors contribute positively to source reduction:

| LENGTH NO STRETCH (IN) | OUNCES 5" FORM PRESSED | OUNCES 7.5" FORM PRESSED | OUNCES 20 × 80 | LENGTH STRETCHED FORM PRESSED 290% | LENGTH STRETCHED FORM PRESSED 320% | LENGTH STRETCHED 20 × 80 200% |
|---|---|---|---|---|---|---|
| 55 | 2.13 | 3.16 | 5.57 | 214.5 | 231 | 165 |
| 60 | 2.3 | 3.45 | 6.06 | 234 | 252 | 180 |
| 70 | 2.68 | 4.03 | 7.1 | 273 | 294 | 210 |
| 80 | 3.072 | 4.64 | 8.11 | 312 | 336 | 240 |
| 90 | 3.456 | 5.22 | 9.12 | 351 | 378 | 270 |
| 100 | 3.84 | 5.75 | 10.2 | 390 | 420 | 300 |
| 120 | 4.6 | 6.9 | 12.17 | 468 | 504 | 360 |
| 130 | 4.99 | 7.48 | 13.18 | 507 | 546 | 390 |
| 140 | 5.37 | 8.05 | 14.2 | 546 | 588 | 420 |
| 150 | 5.76 | 8.63 | 15.21 | 585 | 630 | 450 |

Based on the information in the above table, the form pressed film of the present invention weighs about 0.0387 to 0.0575 ounces per inch, as compared to the standard 20×80 film which weighs about 0.1014 ounces per inch.

In another example, a 5" wide length of stretch film of the present invention was compared to standard 20×80 gauge stretch film. Varying levels of hydroforce were placed on each film I and II. The designation I represents 5" wide form pressed stretch film of the present invention. The designation II represents a standard 20×80 film of the prior art. The standard 20×80 film was stretched to 351% prior to breaking. The film of the present invention stretched to 576% before breaking. The pertinent data is set forth in the following table:

| STRETCH PERCENT I | STRETCH PERCENT II | HYDRO FORCE I | HYDRO FORCE II | PRESTRETCH FORCE I | PRESTRETCH FORCE II | UNWIND FORCE I | UNWIND FORCE II |
|---|---|---|---|---|---|---|---|
| 26 | 109 | 2080 | 2000 | 120.8 | 23.8 | 0.03 | 7.2 |
| 114 | 158 | 2080 | 2100 | 119.2 | 24 | 0.6 | 6.7 |
| 170 | 185 | 2200 | 2200 | 125.6 | 23.6 | 0.6 | 6.6 |
| 280 | 222 | 2375 | 2300 | 133.6 | 24 | 0.6 | 6.6 |
| 375 | 265 | 2450 | 2410 | 124.8 | 25.8 | 0.6 | 6.8 |
| 422 | 291 | 2475 | 2450 | 133.6 | 26.4 | 0.6 | 6.1 |
| 459 | 309 | 2488 | 2500 | 129.6 | 28 | 0.63 | 6.3 |
| 459 | 311 | 2494 | 2530 | 129.6 | 28.2 | 0.6 | 5.4 |
| 484 | 335 | 2502 | 2570 | 131.2 | 30.2 | 0.6 | 5.5 |
| 515 | 351 | 2508 | 2600 | 130.4 | 33 | 0.6 | 6 |
| 521 | | 2516 | | 136 | | 0.6 | |
| 523 | | 2520 | | 136 | | 0.6 | |
| 520 | | 2526 | | 133.6 | | 0.6 | |
| 576 | | 2532 | | 142.4 | | 0.6 | |

I = 5 " WIDE FORM PRESSED STRETCH FILM OF THE PRESENT INVENTION
II = STANDARD 20 × 80 GAUGE FILM

In yet another example, the stretchability of the present 5" stretch film was compared to that of a standard 120 gauge film. The stretch percent comparisons are provided in the following table:

| HYDROFORCE | FORM PRESSED STRETCH PERCENT | STANDARD 120 GAUGE STRETCH PERCENT |
|---|---|---|
| 2000 | 34 | 109 |
| 2050 | 124 | |
| 2100 | 146 | 158 |
| 2150 | 160 | 160 |
| 2175 | | 168 |
| 2200 | 179 | 185 |
| 2225 | | 190 |
| 2250 | 195 | 202 |
| 2275 | | 218 |
| 2300 | 224 | 222 |
| 2325 | | 245 |
| 2350 | 258 | 234 |
| 2365 | | 254 |
| 2375 | 281 | |
| 2380 | | 258 |
| 2395 | | 262 |
| 2400 | 306 | |
| 2410 | 310 | 265 |
| 2420 | 314 | |
| 2425 | | 278 |
| 2430 | 325 | |
| 2440 | 339 | 287 |
| 2450 | 367 | 291 |
| 2460 | 370 | 303 |
| 2470 | 396 | 298 |
| 2480 | 412 | 297 |
| 2485 | 420 | |

-continued

| HYDROFORCE | FORM PRESSED STRETCH PERCENT | STANDARD 120 GAUGE STRETCH PERCENT |
|---|---|---|
| 2487 | 432 | |
| 2489 | 426 | |
| 2490 | | 311 |
| 2491 | 440 | |
| 2493 | 442 | |

As will be noted, the film of the present invention stretched to 442% before breaking while the standard 120 gauge film broke just past 311% stretch.

Based on the above data, the film of the present invention serves to improve source reduction. For example, where standard stretch film requires 12 ounces of film, the stretch strap film of the present invention requires only 4 ounces of film. The film of the present invention offers ease of application along with breathability because it need not be applied in a self-overlapping manner. FIG. 8 shows how the present stretch film may be applied to a pallet load. Moreover, there are savings of 5 to ten percent in cost over the standard film of the prior art.

Typical prior art film stretches to 200% during normal application. Film of the present invention, in comparison, may stretch to at least 320%, and well beyond. Widths of 16 to 20 inches are known in the prior art. These prior films, because they are so wide, call for the film to cover the entire pallet, thus causing breathing problems.

Resins used in preparing films of the prior art do not provide the stretch needed. It is desirable to form a tight rubber band like effect about the pallet load using stretch film. A typical 200 percent film would not be sufficient to reduce source and provide for a tight fit around a pallet load. It has been determined that there is a need to have at least 300 percent stretch to get a tight band about a pallet load.

It has also been determined that thicker gauge films formed in accordance with the present invention show reduced neck down. This is a commercially advantageous feature. Conventional 120 gauge film will neck down to a greater extent than a 120 gauge form pressed film of the present invention. In further testing, it was determined that a five inch wide film was stretched to 250% and necked down to three inches. A seven and one half inch wide film was stretched to 250% and necked down to six inches. A conventional non-formpressed film at 5" wide necked down to one and one half inches. The present 120 gauge laminated film is made by form pressing two 60 gauge films together.

When stretching the film of the present invention, it is important to stop the stretching process about five percent before its yield point. Any stretch up to the yield point will allow the film to retain its memory and reduce back to its original size.

An advantage of the present invention is that standard stretch film application machinery can be used. Stretch machinery designed to stretch film to 150% can be easily modified to stretch the film from well beyond 280% to 320%.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

We claim:

1. A stretch film, comprising:

a first extruded sheet of polyethylene stretch film having a plurality of coextruded layers;

a second extruded sheet of polyethylene stretch film having a plurality of coextruded layers, the second extruded sheet clingingly form pressed to the first extruded sheet to completely laminate the first sheet, to form a machine wrappable stretch film that is elastically stretchable beyond 320% without breaking and not heat shrinkable.

2. A palleting stretch film, as set forth in claim 1, wherein the first extruded sheet of polyethylene stretch film is comprised of at least three coextruded layers, and the second extruded sheet of polyethylene stretch film is comprised of at least three coextruded layers.

3. A palleting stretch film as set forth in claim 2 wherein the first extruded sheet of polyethylene stretch film has an ABA construction wherein B is the core and A represents a skin portion.

4. A palleting stretch film as set forth in claim 2 wherein the first extruded sheet of polyethylene stretch film has an ABA construction wherein B is the core and A represents a skin portion, and the second extruded sheet of polyethylene film has an ABA construction wherein B is the core and A represents a skin portion.

5. A palleting stretch film as set forth in claim 1 wherein the stretch film is adapted to wrap a pallet without a substantial self overwrap to maintain breathablility of the pallet load.

6. A palleting stretch film as set forth in claim 1 wherein the film has a prestretch force of 119.2 grams or greater.

* * * * *